US010647380B2

(12) United States Patent
Saruwatari

(10) Patent No.: US 10,647,380 B2
(45) Date of Patent: May 12, 2020

(54) ELECTRICALLY ASSISTED VEHICLE

(71) Applicant: YAMAHA HATSUDOKI KABUSHIKI KAISHA, Iwata-shi, Shizuoka (JP)

(72) Inventor: Yutaka Saruwatari, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 284 days.

(21) Appl. No.: 15/903,068

(22) Filed: Feb. 23, 2018

(65) Prior Publication Data

US 2018/0257741 A1    Sep. 13, 2018

(30) Foreign Application Priority Data

Mar. 9, 2017 (JP) .................................. 2017-045129

(51) Int. Cl.
| | |
|---|---|
| *B62M 6/50* | (2010.01) |
| *B62M 6/45* | (2010.01) |
| *B62J 9/21* | (2020.01) |
| *B62J 11/00* | (2020.01) |
| *B62M 3/08* | (2006.01) |
| *B62M 6/70* | (2010.01) |
| *B62M 6/90* | (2010.01) |

(Continued)

(52) U.S. Cl.
CPC .................. *B62M 6/50* (2013.01); *B62J 9/21* (2020.02); *B62J 11/00* (2013.01); *B62M 3/08* (2013.01); *B62M 6/45* (2013.01); *B62M 6/70* (2013.01); *B62M 6/90* (2013.01); *B60L 2200/12* (2013.01); *B62K 19/34* (2013.01); *H01M 2/1083* (2013.01); *H01M 2/305* (2013.01)

(58) Field of Classification Search
None
See application file for complete search history.

(56) References Cited

U.S. PATENT DOCUMENTS

| | | | |
|---|---|---|---|
| 2014/0209400 | A1 | 7/2014 | Yao et al. |
| 2014/0341373 | A1 | 11/2014 | Song et al. |

(Continued)

FOREIGN PATENT DOCUMENTS

| | | |
|---|---|---|
| CN | 103963910 A | 8/2014 |
| CN | 104512494 A | 4/2015 |

(Continued)

*Primary Examiner* — Richard M Camby
(74) *Attorney, Agent, or Firm* — Keating & Bennett, LLP

(57) ABSTRACT

An electrically assisted vehicle includes an electric motor, a device including a microcontroller and a transmission circuit that sends motor control-related data used to control rotation of the electric motor, and a control circuit that controls the electric motor based on the data. The control circuit and the device both retain the same data generation rule. When the control circuit sends first data to the device, the microcontroller generates second data which at least includes a portion of first reception data having been received, generates third data from the second data by using the rule, and sends, via the transmission circuit, the third data to the control circuit. The control circuit generates fourth data at least from the first data by using the rule, and compares a portion of second reception data received from the device against the fourth data. If the result of comparison indicates a match, the control circuit permits control of the electric motor.

15 Claims, 11 Drawing Sheets

(51) Int. Cl.
  *B62K 19/34* (2006.01)
  *H01M 2/10* (2006.01)
  *H01M 2/30* (2006.01)

(56) References Cited

U.S. PATENT DOCUMENTS

| | | |
|---|---|---|
| 2015/0091698 A1 | 4/2015 | Du |
| 2016/0075226 A1* | 3/2016 | Biderman ............... B60L 3/003 301/6.5 |
| 2016/0082772 A1* | 3/2016 | Biderman ........... B60B 27/0015 301/6.5 |
| 2016/0243927 A1* | 8/2016 | Biderman ............ A61B 5/7282 |

FOREIGN PATENT DOCUMENTS

| | | |
|---|---|---|
| EP | 2 716 531 A1 | 4/2014 |
| JP | 09-226664 A | 9/1997 |

* cited by examiner

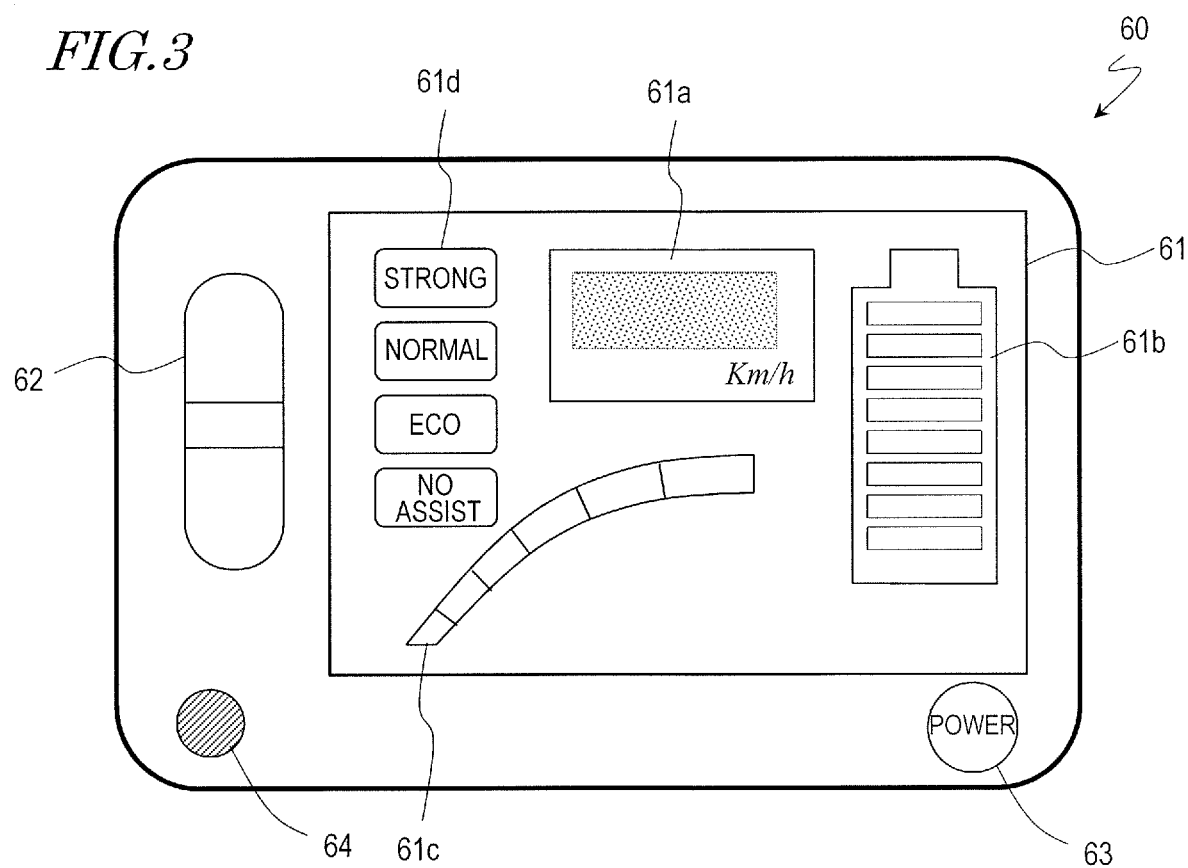

ELECTRICALLY ASSISTED VEHICLE

CROSS REFERENCE TO RELATED APPLICATIONS

This application claims the benefit of priority to Japanese Patent Application No. 2017-045129 filed on Mar. 9, 2017. The entire contents of this application are hereby incorporated herein by reference.

BACKGROUND OF THE INVENTION

1. Field of the Invention

The present invention relates to electrically assisted vehicles.

2. Description of the Related Art

Electrically assisted bicycles are known in which an electric motor provides assistance for the force with which a rider moves the pedals. In an electrically assisted bicycle, the electric motor generates an assistance force which is in accordance with the man power that a rider applies to the pedals, such that a driving power which is a sum of the man power and the assistance force is transmitted to a driving wheel. As the electric motor provides assistance for the man power, the force with which the rider must move the pedals can be reduced (see, for example, Japanese Laid-Open Patent Publication No. 09-226664).

In a commonly-used electrically assisted vehicle, a control panel is provided near a handle grip. The rider manipulates the control panel in order to select one of a plurality of assist modes. In determining the magnitude of the assistance force to be generated by the electric motor, a control circuit which controls rotation of the electric motor utilizes a signal from the control panel that indicates the selected assist mode, a torque signal from a torque sensor that indicates the magnitude of the man power applied to the pedals, and the like. As a result, an assistance force which is in accordance with the selected assist mode and the magnitude of the force with which the pedals are moved is generated by the electric motor.

Many countries provide regulations concerning conditions under which an assistance force is allowed to be generated as well as the magnitude thereof. In order to abide by such regulations, it is preferable that the control circuit has the ability to confirm that any device that outputs a signal to the control circuit (e.g., the control panel and the torque sensor) is compliant and that such devices are properly operating.

SUMMARY OF THE INVENTION

Preferred embodiments of the present invention provide electrically assisted vehicles which allow an appropriate assistance force to be generated.

An electrically assisted vehicle according to a preferred embodiment of the present invention includes an electric motor; a device including a microcontroller and a transmission circuit which sends motor control-related data used to control rotation of the electric motor; and a control circuit that controls the electric motor based on the motor control-related data; wherein the control circuit and the device communicate with each other and both retain a same data generation rule; when the control circuit sends first data to the device, the transmission circuit receives first reception data from the control circuit, the microcontroller generates second data at least including a portion of the first reception data, the microcontroller generates third data from the second data by using the data generation rule, and the transmission circuit sends the third data to the control circuit; and the control circuit receives second reception data from the device, generates fourth data at least from the first data by using the data generation rule, compares a portion of the second reception data and the fourth data, and if a result of the comparison indicates a match, permits control of the electric motor that is based on the motor control-related data.

In one preferred embodiment of the present invention, if the result of the comparison indicates a non-match, the control circuit prohibits any control of the electric motor that is based on the motor control-related data from the device.

In one preferred embodiment of the present invention, the first reception data received by the transmission circuit includes the first data; the microcontroller generates the third data from the second data by using the data generation rule, and the second data includes the first data; the second reception data received by the control circuit includes the third data; and the control circuit generates the fourth data from the first data by using the data generation rule, and compares the third data against the fourth data.

In one preferred embodiment of the present invention, the third data includes the motor control-related data.

In one preferred embodiment of the present invention, the control circuit alters the content of the first data each time sending the first data to the device.

In one preferred embodiment of the present invention, in response to the first reception data received from the control circuit, the transmission circuit sends the third data to the control circuit.

In one preferred embodiment of the present invention, the third data includes data other than the motor control-related data.

In one preferred embodiment of the present invention, the control circuit includes a storage which stores first data of a latest generation that has been sent to the device and which stores first data from one generation before the latest generation; and the control circuit reads from the storage the first data of the latest generation and the first data from the one generation before the latest generation, generates pieces of the fourth data respectively from the first data of the latest generation and the first data from the one generation before by using the data generation rule, and, if a portion of the second reception data matches either piece of the fourth data, permits control of the electric motor that is based on the motor control-related data.

In one preferred embodiment of the present invention, the control circuit includes a storage which stores fourth data of a latest generation and which stores fourth data from one generation before the latest generation; and the control circuit reads from the storage the fourth data of the latest generation and the fourth data from the one generation before the latest generation, and, if a portion of the second reception data matches either fourth data, permits control of the electric motor that is based on the motor control-related data.

In one preferred embodiment of the present invention, the first reception data received by the device includes the first data; the second data includes the first data and the motor control-related data; the microcontroller generates the third data from the first data included in the second data by using the data generation rule, and the transmission circuit sends the third data and the motor control-related data to the control circuit; the second reception data received by the control circuit includes the third data and the motor control-related data; and the control circuit generates the fourth data from the first data and the motor control-related data by using the data generation rule, and compares the third data included in the second reception data against the fourth data.

In one preferred embodiment of the present invention, while the control circuit is controlling the electric motor based on the motor control-related data from the device, the control circuit intermittently sends the first data to the device, and if the result of the comparison fails to indicate a match for a predetermined period of time or longer, prohibits any control of the electric motor that is based on the motor control-related data.

In one preferred embodiment of the present invention, the motor control-related data is data representing a walk assist mode, the walk assist mode being an operating mode in which the electric motor is operated irrespective of whether the rider is riding on the electrically assisted vehicle or not.

In accordance with preferred embodiments of the present invention, control circuits in electrically assisted vehicles are able to confirm that devices that communicate with the control circuits are compliant and that the devices are properly operating. This allows the control circuits to control electric motors so as to generate appropriate assistance forces.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 is an outer view of an exemplary control panel 60.

DETAILED DESCRIPTION OF THE PREFERRED EMBODIMENTS

Figure 1:
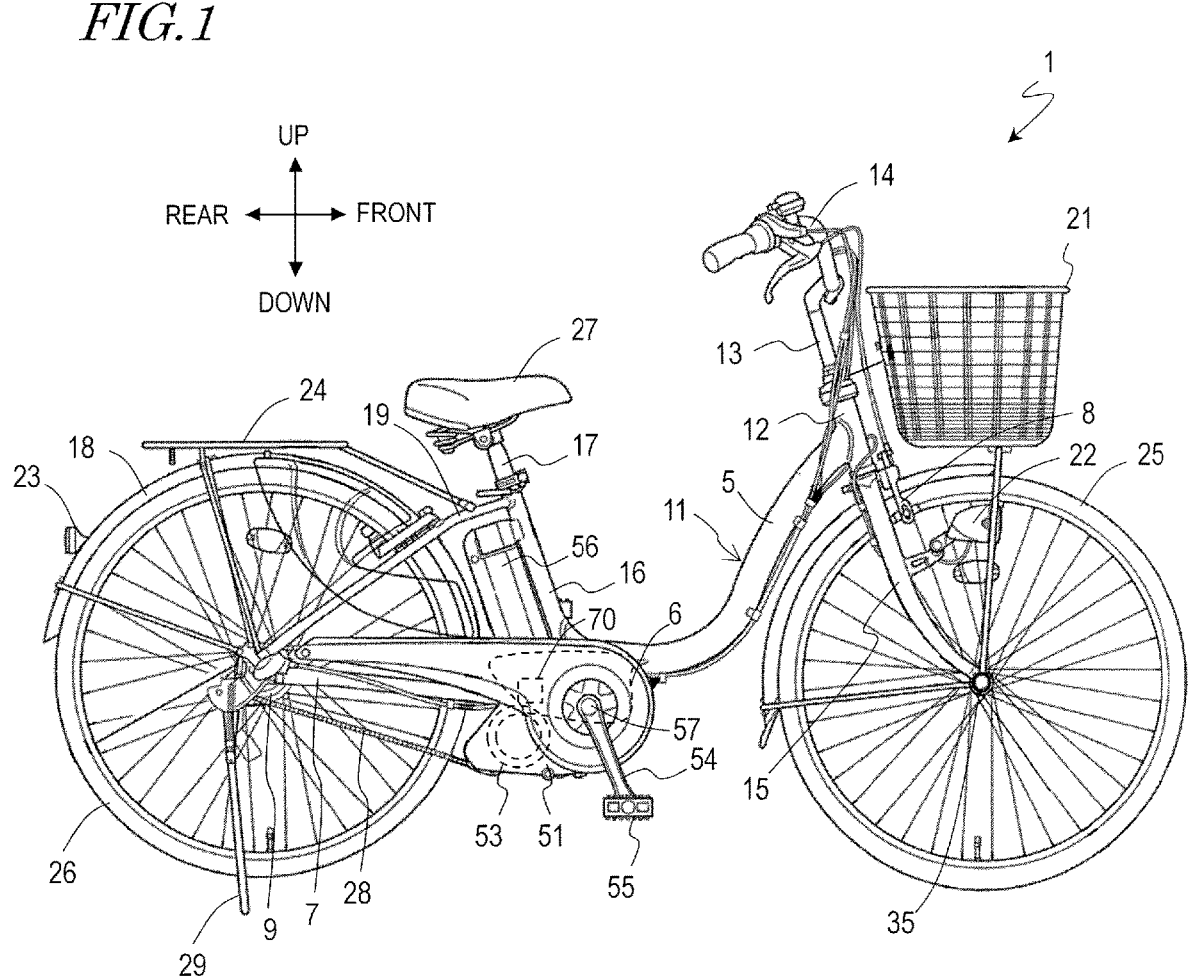
FIG. 1 is a side view showing an electrically assisted bicycle 1.

Hereinafter, with reference to the attached drawings, preferred embodiments of electrically assisted vehicles according to the present invention will be described. In the description of the preferred embodiments, like elements will be denoted by like reference numerals, and any overlapping description will not be repeated. In the preferred embodiments of the present invention, any reference to "front/rear", "right/left" and "above(up)/below(down)" is based on a state where a rider is seated on a saddle (seat) of an electrically assisted vehicle so as to face the handle bars. Note that the following preferred embodiments are illustrative, and the present invention is not limited to the following preferred embodiments.

First Preferred Embodiment

FIG. 1 is a side view showing an electrically assisted bicycle 1 according to the present preferred embodiment. The electrically assisted bicycle 1 includes a drive unit 51 which will be specifically described below. The electrically assisted bicycle 1 is an example of an electrically assisted vehicle according to a preferred embodiment of the present invention. The drive unit 51 is an example of an electrical assistance system according to a preferred embodiment of the present invention.

The electrically assisted bicycle 1 includes a body frame 11 which extends in the front-rear direction. The body frame 11 includes a head pipe 12, a down tube 5, a bracket 6, a chain stay 7, a seat tube 16, and a seat stay 19. The head pipe 12 is disposed at the front end of the body frame 11. A handle stem 13 is inserted in the head pipe 12 so as to be capable of rotation. A handle bar 14 is fixed at an upper end portion of the handle stem 13. At a lower end portion of the handle stem 13, front forks 15 are fixed. A front wheel 25, defining a steering wheel, is supported at a lower end portion of the front forks 15 so as to be capable of rotation. A brake 8 that acts on the front wheel 25 is provided on the front forks 15. A front basket 21 is provided forward of the head pipe 12. A head lamp 22 is provided on the front forks 15.

The down tube 5 extends obliquely below and rearward from the head pipe 12. The seat tube 16 extends upward from a rear end portion of the down tube 5. The chain stay 7 extends rearward from a lower end portion of the seat tube 16. The bracket 6 connects together the rear end portion of the down tube 5, the lower end portion of the seat tube 16, and a front end portion of the chain stay 7.

A seat post 17 is inserted in the seat tube 16, and a saddle 27 for a rider to sit on is provided at an upper end portion of the seat post 17. A rear portion of the chain stay 7 supports the rear wheel 26, which defines and functions as a driving wheel, so as to be capable of rotation. A brake 9 that acts on the rear wheel 26 is provided at the rear portion of the chain stay 7. Moreover, a kickstand 29 to retain the vehicle in an upright position during parking is provided at the rear portion of the chain stay 7. The seat stay 19 extends obliquely below and rearward from an upper portion of the seat tube 16. A lower end portion of the seat stay 19 is connected to the rear portion of the chain stay 7. The seat stay 19 supports a luggage rack 24 which is provided rearward of the saddle 27, and also supports a fender 18 that covers the rear wheel 26 from above. A tail lamp 23 is provided at a rear portion of the fender 18.

The drive unit 51 is disposed in the bracket 6, which itself is placed near the vehicle central portion of the body frame 11. The drive unit 51 includes an electric motor 53, a crank shaft 57, and a control apparatus 70. A battery 56 that supplies electric power to the electric motor 53 and the like is mounted on the bracket 6. The battery 56 may be supported by the seat tube 16.

The crank shaft 57 is supported by the drive unit 51 and penetrates therethrough in the right-left direction. Crank arms 54 are provided at both ends of the crank shaft 57. At the leading end of each crank arm 54, a pedal 55 is provided so as to be capable of rotation.

The control apparatus 70 controls the operation of the electrically assisted bicycle 1. Typically, the control apparatus 70 includes a control circuit such as a microcontroller, a signal processor, etc., that is capable of digital signal processing. The control circuit is, for example, a semiconductor integrated circuit.

A rotational output of the crank shaft 57 which is generated as the rider steps on the pedals 55 with his or her feet is transmitted to the rear wheel 26 via the chain 28. The control circuit in the control apparatus 70 controls the electric motor 53 so as to generate a drive assisting output which is in accordance with the axial torque of the crank shaft 57 that is ascribable to the pedaling force of the rider. The assistance force which is generated by the electric motor 53 is transmitted to the rear wheel 26 via the chain 28. Instead of the chain 28, a belt, a shaft, or the like may be used.

Next, the specific construction of the control apparatus 70 and sensors which generate signals to be utilized in the operation of the control apparatus 70 will be described in detail.

Figure 2:
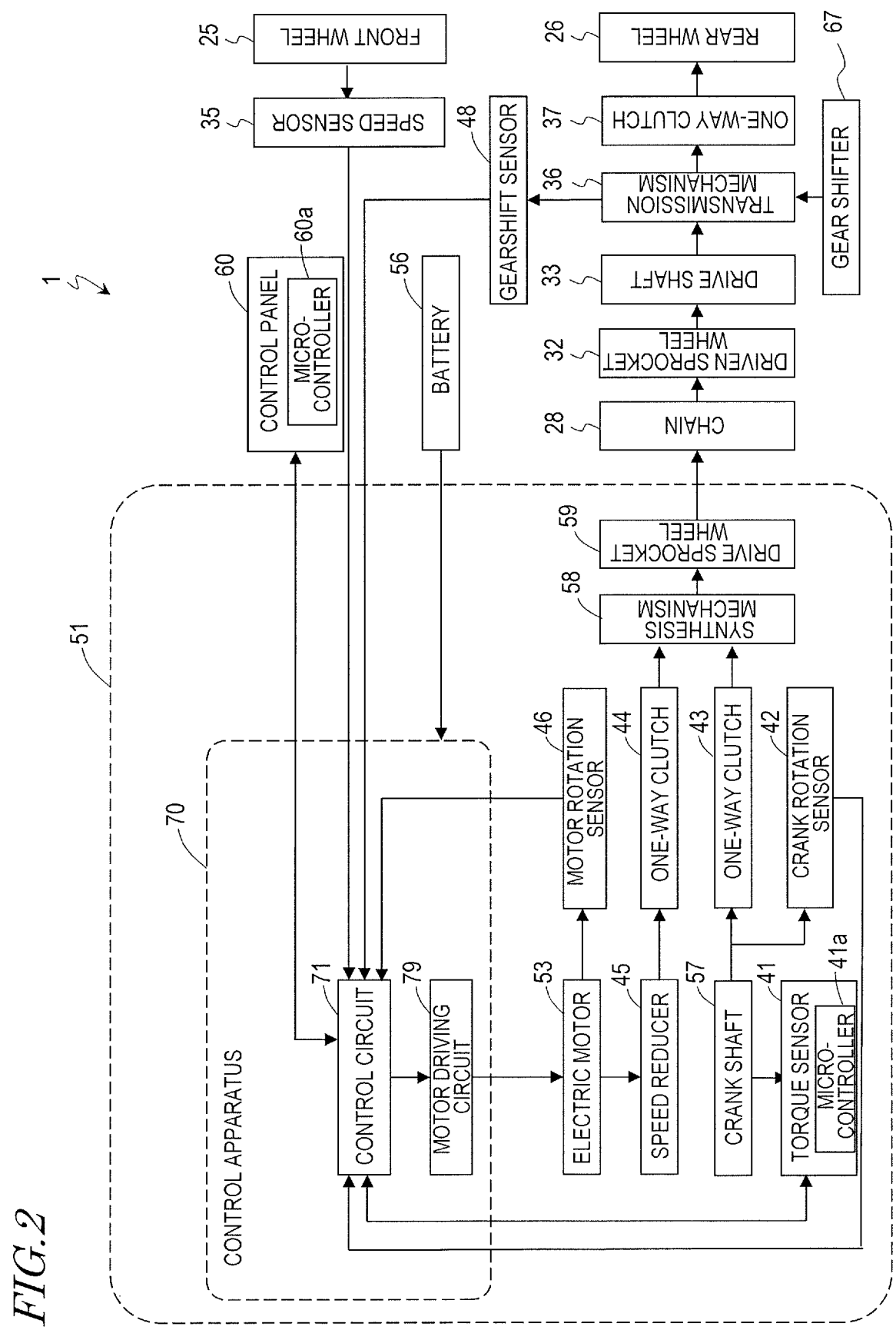
FIG. 2 is a block diagram showing an exemplary mechanical construction of the electrically assisted bicycle 1.

FIG. 2 is a block diagram showing an exemplary mechanical construction of the electrically assisted bicycle 1.

FIG. 2 depicts the control apparatus 70 and its surrounding environment. Exemplified as the surrounding environment include various sensors which output signals to the control apparatus 70, and the electric motor 53 which is driven based on a result of operation of the control apparatus 70.

First, the surrounding environment of the control apparatus 70 will be described.

As mentioned above, the control apparatus 70 defines a portion of the drive unit 51. FIG. 2 shows a torque sensor 41, a crank rotation sensor 42, and the electric motor 53, which are also elements of the drive unit 51. Furthermore, an acceleration sensor may be included (not shown). The control apparatus 70 includes a control circuit 71 and a motor driving circuit 79.

As a torque occurs in the crank shaft 57, the torque sensor 41 detects the man power (pedaling force) which is applied the pedals 55 by the rider. The torque sensor 41 may be a magnetostrictive torque sensor, for example. The torque sensor 41 generates a voltage signal having an amplitude which is in accordance with the magnitude of the detected torque. The torque sensor 41 includes an arithmetic circuit or a microcontroller 41a which translates the voltage signal into torque data. The microcontroller 41a may include an A/D converter which converts a generated analog voltage signal into a digital voltage signal, and a computation core which calculates a torque from the magnitude of the digital voltage signal, for example. Note that the A/D converter may be external to the microcontroller 41a. The microcontroller 41a sends the torque data to the control circuit 71 via a communication interface not shown, e.g., a communication terminal.

The crank rotation sensor 42 detects an angle of rotation of the crank shaft 57. For example, the crank rotation sensor 42 may detect rotation of the crank shaft 57 at every predetermined angle, and output a rectangular wave signal or a sine wave signal. By using the output signal, the angle of rotation and rotational speed of the crank shaft 57 is calculated. For example, a plurality of pieces of magnetic material each including magnetic poles (an N pole and an S pole) are provided around the crank shaft 57. With Hall sensors in fixed positions, polarity changes in the magnetic field that are associated with rotation of the crank shaft 57 are converted into voltage signals. By using output signals from the Hall sensors, the control circuit 71 counts polarity changes in the magnetic field, and calculates an angle of rotation and a rotational speed of the crank shaft 57. The crank rotation sensor 42 may include an arithmetic circuit or a microcontroller which calculates the angle of rotation and rotational speed of the crank shaft 57 from the output signals.

The motor driving circuit 79 may be an inverter, for example. From the battery 56, the motor driving circuit 79 allows a current having an amplitude, a frequency, a direction of flow, etc., that are in accordance with a motor current command value from the control circuit 71 to be supplied to the electric motor 53. Upon receiving this current, the electric motor 53 rotates so as to generate an assistance force with the determined magnitude. A current sensor, which is not shown, detects the value of the current flowing in the electric motor 53, and outputs it to the control apparatus 70. The control apparatus 70 performs feedback control by using the output signal from the current sensor.

The electric motor 53 illustrated in FIG. 2 is, for example, a three-phase motor having coils in three phases (U phase, V phase, W phase). The electric motor 53 may be a brushless DC motor, for example. Although it is assumed herein that the current sensor detects currents in all of the three phases, only currents in two phases may be detected. Under three-phase power control, a sum of the current values in the respective phases should theoretically be zero. By using this relationship, two electric current values will allow the remaining electric current value to be determined through computations. Thus, electric current values of all of the three phases are able to be acquired.

Rotation of the electric motor 53 is detected by the motor rotation sensor 46. The motor rotation sensor 46 may be Hall sensors, for example, which detect a magnetic field that is created by a rotating rotor (not shown) of the electric motor 53 to output voltage signals which are in accordance with the intensity or polarity of the magnetic field. In the case in which the electric motor 53 is a brushless DC motor, a plurality of permanent magnets are provided on the rotor. The motor rotation sensor 46 converts polarity changes in the magnetic field that are associated with rotation of the rotor into voltage signals. By using the output signals from the motor rotation sensor 46, the control circuit 71 counts polarity changes in the magnetic field, and calculates an angle of rotation and a rotational speed of the rotor.

The assistance force which is generated by the electric motor 53 is transmitted to the rear wheel 26 via the motive power transmission mechanism. The motive power transmission mechanism includes the chain 28, a driven sprocket wheel 32, a drive shaft 33, a transmission mechanism 36, a one-way clutch 37, and the like, which will be described below with reference to FIG. 2. The above construction makes it possible to provide assistance to the man power of the rider on the electrically assisted bicycle 1.

Upon receiving the detection values that are output from the various sensors and the manipulation data which is output from the control panel 60, the control circuit 71 controls the electric motor 53 based on the detection values and/or the manipulation data. To "control" includes: beginning rotation of the electric motor 53; maintaining rotation; stopping rotation; decreasing or increasing rotation and maintaining that state of rotation; and gradually decreasing rotation until finally stopping rotation. The detection values to be output from the various sensors may be, for example, a torque value and a rotational angle value that are respectively output from the torque sensor 41 and the crank rotation sensor 42. The control circuit 71 sends to the motor driving circuit 79 a motor current command value to generate an assistance force of the required magnitude. This causes the electric motor 53 to rotate such that a driving power of the electric motor 53 is transmitted to the rear wheel 26. As a result, the driving power of the electric motor 53 is added to the man power of the rider.

Alternatively, the control circuit 71 may prohibit any control of the rotation of the electric motor 53 that is based on the detection value and/or the manipulation data. In this case, the control circuit 71 performs a predetermined operation, e.g., an operation of stopping rotation of the electric motor 53.

Note that the detection signals that are output from the various sensors are analog signals. Generally speaking, before a detection signal can be input to the control apparatus 70, an A/D conversion circuit (not shown) which converts the analog signal into a digital signal may be provided. Such an A/D conversion circuit may be provided within each sensor, or within the drive unit 51 so as to be situated on a signal path between each sensor and the control apparatus 70. Alternatively, such A/D conversion circuits may be provided within the control apparatus 70. Note that all or some of the various sensors may include an arithmetic circuit or a microcontroller which translates the detection signal into data, as does the torque sensor 41 of the present preferred embodiment.

The magnitude of the assistance force to be generated by the electric motor 53 may vary depending on the assist mode that is currently selected. The assist mode is able to be selected by the rider using the control panel 60.

The control panel 60 is mounted on the handle bar 14 (FIG. 1) of the electrically assisted bicycle 1, so as to be connected to the control apparatus 70 via wired cables, for example. The control panel 60 includes a microcontroller 60a. The microcontroller 60a sends via a communication interface (not shown), e.g., a communication terminal, manipulation data representing a manipulation which has been made by the rider to the control apparatus 70, and receives and presents various data to the rider from the control apparatus 70.

In the present preferred embodiment, the control circuit 71 outputs a motor current command value to the motor driving circuit 79 such that the electric motor 53 rotates or stops. In other words, the control circuit 71 controls rotation of the electric motor 53.

From the control panel 60, the control circuit 71 receives manipulation data representing the selected assist mode or the walk assist mode (described below), and from the torque sensor 41 the control circuit 71 receives torque data representing the magnitude of the man power which is applied to the pedals 55. By utilizing such received data, the control circuit 71 determines the magnitude of the assistance force for the electric motor to generate. The control circuit 71 may also receive signals from various electronic components (transmission circuits) other than the control panel 60 and the torque sensor 41, and utilize them in determining the torque, rotational speed, etc., for the electric motor 53 to generate. The control panel 60 and the torque sensor 41 are examples of transmission circuits that output signals used by the control circuit 71 to control rotation of the electric motor 53.

Note that the control circuit 71 may operate by receiving data from only one of the control panel 60 and the torque sensor 41. For example, even when not receiving any manipulation data from the control panel 60, the control circuit 71 may calculate an electric current command value to drive the electric motor 53 based on the torque data from the torque sensor 41 alone. Conversely, when receiving manipulation data from the control panel 60 but not any torque data, the control circuit 71 may calculate an electric current command value based on the manipulation data. An example of the latter case may be in which the rider has pressed a walk assist mode button, and is pushing the electrically assisted bicycle 1 without riding on the electrically assisted bicycle 1 in an uphill situation, etc. The walk assist mode button will be described below with reference to FIG. 3.

Next, the transmission path of motive power in the electrically assisted bicycle 1 will be described.

Once the rider has stepped on the pedals 55 to rotate the crank shaft 57, this rotation of the crank shaft 57 is transmitted to a synthesis mechanism 58 via a one-way clutch 43. Rotation of the electric motor 53 is transmitted to the synthesis mechanism 58 via a speed reducer 45 and a one-way clutch 44.

The synthesis mechanism 58 may include, e.g., a cylindrical member, such that the crank shaft 57 is disposed inside the cylindrical member. The synthesis mechanism 58 includes a drive sprocket wheel 59 mounted thereto. The synthesis mechanism 58 rotates around the same axis of rotation as the crank shaft 57 and the drive sprocket wheel 59.

The one-way clutch 43 transmits any forward rotation of the crank shaft 57 to the synthesis mechanism 58, while not transmitting any backward rotation of the crank shaft 57 to the synthesis mechanism 58. The one-way clutch 44 transmits to the synthesis mechanism 58 any rotation that is generated by the electric motor 53 in a direction of causing forward rotation of the synthesis mechanism 58, while not transmitting to the synthesis mechanism 58 any rotation occurring in a direction of causing backward rotation of the synthesis mechanism 58. Moreover, while the electric motor 53 is stopped, if the rider has moved the pedals 55 so that the synthesis mechanism 58 rotates, the one-way clutch 44 does not transmit this rotation to the electric motor 53. The pedaling force which the rider has applied to the pedals 55 and the assistance force which has been generated by the electric motor 53 are transmitted to the synthesis mechanism 58, where they are merged. The resultant force as synthesized by the synthesis mechanism 58 is transmitted to the chain 28 via the drive sprocket wheel 59.

Rotation of the chain 28 is transmitted to the drive shaft 33 via the driven sprocket wheel 32. Rotation of the drive shaft 33 is transmitted to the rear wheel 26 via the transmission mechanism 36 and the one-way clutch 37.

The transmission mechanism 36 alters the gear ratio in response to the rider's manipulation of a gear shifter 67. The gear shifter 67 may be mounted on the handle bar 14 (FIG. 1), for example. If the rotational speed of the drive shaft 33 is faster than the rotational speed of the rear wheel 26, the one-way clutch 37 transmits rotation of the drive shaft 33 to the rear wheel 26. If the rotational speed of the drive shaft 33 is slower than the rotational speed of the rear wheel 26, the one-way clutch 37 does not transmit rotation of the drive shaft 33 to the rear wheel 26.

The pedaling force which has been applied by the rider to the pedals 55 and the assistance force which has been generated by the electric motor 53 are transmitted to the rear wheel 26 via the aforementioned transmission path of motive power.

FIG. 3 is an outer view of an exemplary control panel 60. The control panel 60 is mounted near a left grip on the handle bar 14, for example.

The control panel 60 includes a display panel 61, an assist mode control switch 62, a power switch 63, and a walk assist mode button 64.

The display panel 61 is a liquid crystal panel, for example. The display panel 61 displays various information, including information concerning the speed of the electrically assisted bicycle 1, the remaining power of the battery 56, a range in which the assist ratio is to be varied, the assist mode, and other kinds of traveling information, such information being provided from the control apparatus 70.

The display panel 61 includes a speed displaying area 61a, a remaining battery power displaying area 61b, an assist ratio variance displaying area 61c, and an assist mode displaying area 61d. The display panel 61 functions as an indicator of such information to the rider, in this example, to display the information.

In the speed displaying area 61a, the vehicle velocity of the electrically assisted bicycle 1 is displayed in numbers. In the present preferred embodiment, the vehicle velocity of the electrically assisted bicycle 1 is detected by using a speed sensor 35 that is provided on the front wheel 25.

In the remaining battery power displaying area 61b, the remaining power of the battery 56 is displayed in segments, based on the information of remaining battery power which is output from the battery 56 to the control apparatus 70. This allows the rider an intuitive grasp of the remaining power of the battery 56.

In the assist ratio variance displaying area 61c, a range within which the assist ratio as set by the control apparatus 70 may vary is displayed in segments. Within this range of variance, additionally, the assist ratio that is currently being used may also be displayed.

In the assist mode displaying area 61d, an assist mode that has been selected by the rider by manipulating the assist mode control switch 62 is displayed. The assist mode may be, e.g., "strong", "normal", and "auto/eco". When the rider has selected the assist mode=OFF by manipulating the assist mode control switch 62, the assist mode displaying area 61d will display "no assist".

The assist mode control switch 62 allows the rider to select one of the aforementioned plurality of assist modes (including assist mode=OFF). When one of the plurality of assist modes is selected, the microcontroller 60a (FIG. 2) internal to the control panel 60 sends manipulation data that identifies the selected assist mode to the control apparatus 70.

The power switch 63 powers the electrically assisted bicycle 1 ON or OFF. By pressing the power switch 63, the rider may power the electrically assisted bicycle 1 ON or OFF.

The walk assist mode button 64 causes the electric motor 53 of the electrically assisted bicycle 1 to operate even when the rider is not riding on the electrically assisted bicycle 1. When the walk assist mode button 64 is pressed down, the electrically assisted bicycle 1 operates in the walk assist mode even when the torque sensor 41 is not detecting any torque. The walk assist mode is an operating mode in which, regardless of whether the rider is actually riding on the electrically assisted bicycle 1 or not, the electrically assisted bicycle 1 travels at a predefined speed, e.g., about 1 km per hour or less. The question as to whether the walk assist mode button 64 is allowed or not and the permitted speed per hour may depend on each country.

The assistance force of the electric motor 53 relative to the crank rotational output becomes consecutively smaller from "strong" to "normal" to "auto/eco".

When the assist mode is "normal", the electric motor 53 generates an assistance force when the electrically assisted bicycle 1 begins to move or when it is moving on flat terrain or uphill, for example. When the assist mode is "strong", similarly to the "normal" mode, the electric motor 53 generates assistance force when the electrically assisted bicycle 1 begins to move or when it is moving on flat terrain or uphill, for example. For the same crank rotational output, the electric motor 53 generates a greater assistance force when the assist mode is "strong" than when it is "normal". When the assist mode is "auto/eco", if there is little pedaling force while moving on flat terrain or downhill, etc., the electric motor 53 may reduce the assistance force compared to the "normal" mode, or altogether stop generating an assistance force, thus reducing power consumption. When the assist mode is "no assist", the electric motor 53 does not generate any assistance force.

Thus, depending on the aforementioned assist mode, the assistance force relative to the crank rotational output varies. In this example, the assist mode is switched in four steps. However, the assist mode may be switched in three or fewer steps, or five or more steps.

Figure 4A:
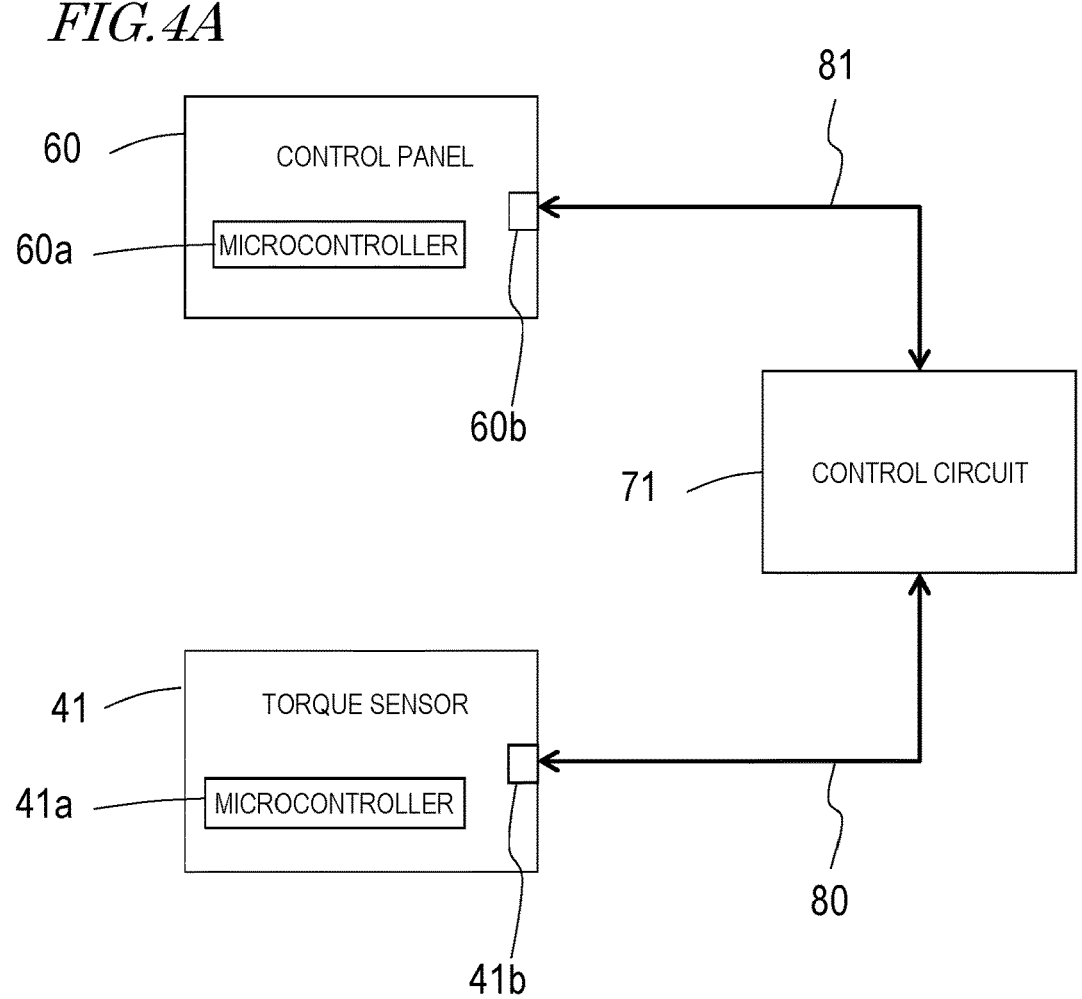
FIG. 4A is a diagram showing a control circuit 71 which is connected via a bus 80 to a torque sensor 41, and connected via a bus 81 to the control panel 60.

FIG. 4A a diagram showing the control circuit 71 being connected via a bus 80 to the torque sensor 41, and connected via a bus 81 to the control panel 60. In the present preferred embodiment, the bus 80 is a wired cable dedicated to connecting the control circuit 71 and transmission circuit 41b of the torque sensor 41 on a one-to-one basis, and the bus 81 is a wired cable dedicated to connecting the control circuit 71 and transmission circuit 60b of the control panel 60 on a one-to-one basis. However, the buses 80 and 81 may be network lines that are installed within the electrically assisted bicycle 1.

The microcontroller 41a of the torque sensor 41 sends, via transmission circuit 41b, torque data representing the magnitude of the detected torque to the control circuit 71. The microcontroller 60a of the control panel 60 also sends, via transmission circuit 60b, manipulation data identifying the selected assist mode to the control circuit 71. Other than manipulation data identifying the selected assist mode, the microcontroller 60a of the control panel 60 may send manipulation data indicating that the walk assist mode button 64 is pressed down when the electrically assisted bicycle 1 is being walked, for example.

In the present preferred embodiment, the control circuit 71, the microcontroller 41a of the torque sensor 41, and the microcontroller 60a of the control panel 60 perform respective computations as will be described below. From the torque sensor 41 and the control panel 60, the control circuit 71 receives results of their computations, and compares these results against a result of a computation that the control circuit 71 has performed on its own. If the result of computation by the torque sensor 41 matches the result of its own computation and the result of computation by the control panel 60 matches the result of its own computation, i.e., if both results of comparison indicate a match, then the control circuit 71 permits control of the electric motor 53 that is based on the torque data from the torque sensor 41 and the manipulation data from the control panel 60. On the other hand, if the results of comparison do not indicate a match, i.e., if one or both of the results of comparison indicates/indicate a non-match, then the control circuit 71 prohibits control of the electric motor 53 that is based on the torque data from the torque sensor 41 and the manipulation data from the control panel 60. Through this, the control circuit 71 is able to confirm whether the torque sensor 41 and the control panel 60 outputting signals to the control circuit 71 are properly operating or not.

In the present specification, any data that may be utilized by the control circuit 71 in order to control the electric motor 53, such as the torque data from the torque sensor 41 and the manipulation data from the control panel 60, may be referred to as "motor control-related data". The "motor control-related data" may be, for example, motor torque data which is generated by the microcontroller 41a of the torque sensor 41 and is sent to the control circuit 71 while the rider is moving the pedals 55. Another example may be, when the rider is not moving the pedals 55 but instead the walk assist mode button 64 on the control panel 60 is pressed down, a request for driving under the walk assist mode, or data indicating the walk assist mode, that is generated by the microcontroller 60a of the control panel 60 and sent to the control circuit 71. Any detection data that is output from various sensors other than the torque sensor 41 may also qualify as "motor control-related data" so long as the control circuit 71 is able to utilize the data to control the electric motor 53.

Furthermore, there may be cases in which the control panel 60 has sophisticated functionality, such as instructing the drive unit 51 as to traveling and/or stopping of the electrically assisted bicycle 1 in response to, e.g., the rider's manipulation. In such cases, a request to drive or a request to stop the electric motor 53 that is issued from the control panel 60 is data which may be utilized by the control circuit 71 to control the electric motor 53. Therefore, such requests are also encompassed within "motor control-related data".

Figure 4B:
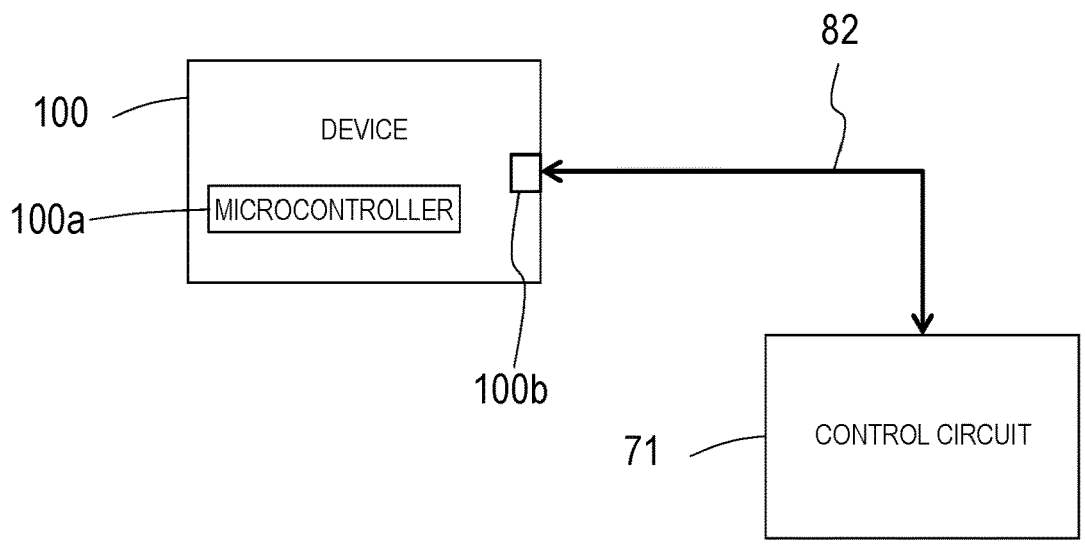
FIG. 4B is a diagram showing a control circuit 71 which is connected via a bus 82 to a device 100.

FIG. 4B is a diagram showing the control circuit 71 being connected via the bus 82 to a device 100. The device 100 includes a microcontroller 100a and a transmission circuit 100b. The device 100 represents an electronic component including, for example, the torque sensor 41 and the control panel 60.

Hereinafter, based on the construction of FIG. 4B, operations of the control circuit 71 and the device 100 as well as communications which are performed between the control circuit 71 and the device 100 will be described.

Figure 5:
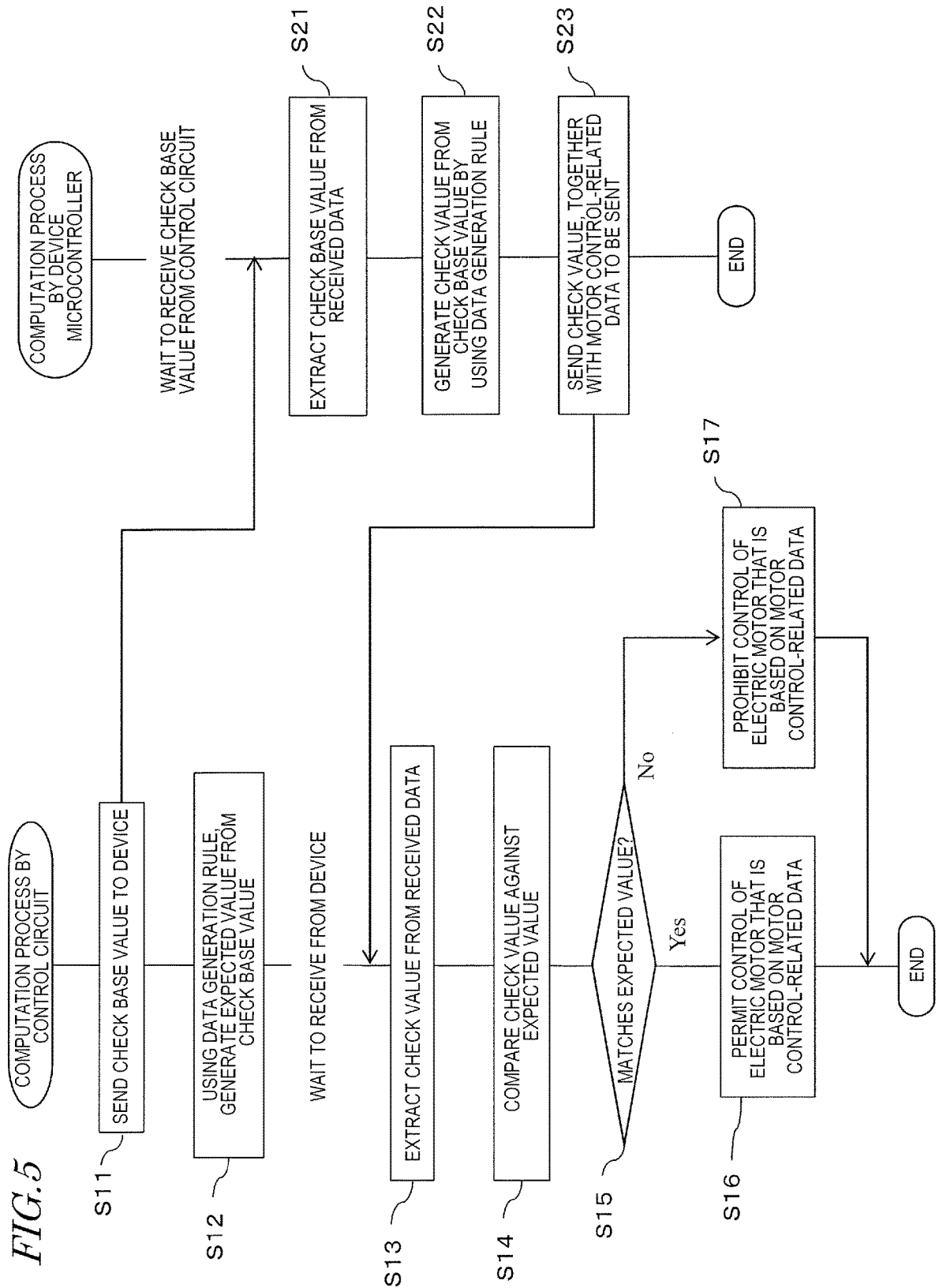
FIG. 5 is a flowchart showing processes respectively performed by the control circuit 71 and a microcontroller 100a of the device 100.

FIG. 5 is a flowchart showing processes according to the present preferred embodiment, which are respectively performed by the control circuit 71 and the microcontroller 100a of the device 100. The control circuit 71 performs its processes according to a procedure shown in the flowchart on the left-hand side, whereas the microcontroller 100a of the device 100 performs its processes according to a procedure shown in the flowchart on the right-hand side. The control circuit 71 executes a computer program including program codes according to the above flowchart, such program codes being copied into a storage (e.g., a random access memory (RAM)) not shown. The microcontroller 100a of the device 100 also executes a computer program including program codes according to the above flowchart, such program codes being copied into a storage (e.g., a RAM) not shown. Furthermore, the control circuit 71 and the device 100 each store a predefined data generation rule in a storage not shown, such that the same data generation rule is shared between the control circuit 71 and the device 100. The details of the data generation rule will be described below.

Hereinafter, the processes of FIG. 5 will be described with reference also to FIGS. 6 and 7.

First, at step S11, the control circuit 71 sends a check base value to the device 100. The "check base value" is a piece of data that is sent from the control circuit 71 to the device 100 to verify whether the device 100 is properly working or not. The check base value may be any arbitrary sequence of numerical values, for example.

Figure 6:
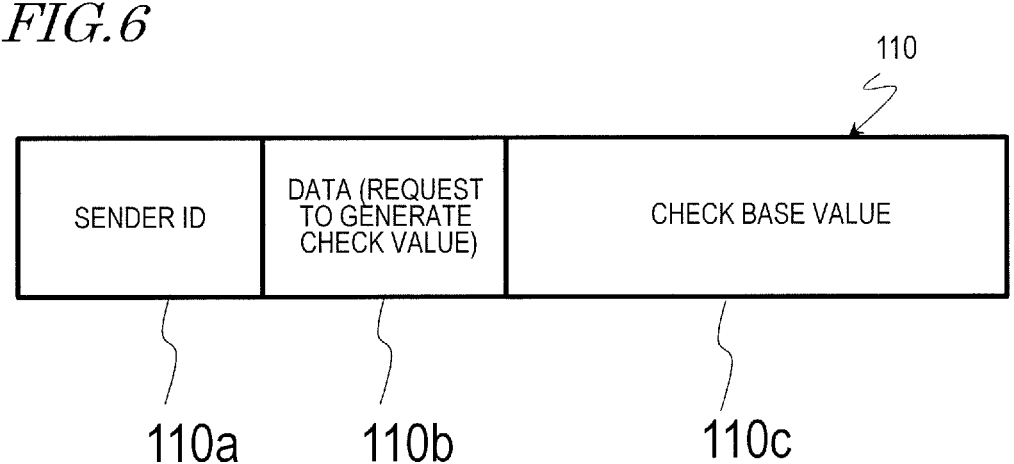
FIG. 6 is a diagram showing a data frame 110 which is sent from the control circuit 71 to the device 100.

FIG. 6 shows a data frame 110 which is sent from the control circuit 71 to the device 100. The data frame 110 includes a sender ID field 110a, a data field 110b, and a check base value field 110c. The sender ID field 110a describes an identifier that uniquely identifies the control circuit 71. The data field 110b stores data to be sent from the control circuit 71 to the device 100, e.g., a request to generate a check value. In the case in which the device 100 is the control panel 60, as the data to be sent from the control circuit 71 to the control panel 60, speed information to be displayed in the speed displaying area 61a is stored in the data field 110b. The check base value field 110c stores a check base value. In accordance with the aforementioned format, the control circuit 71 constructs the data frame 110.

After sending a check base value to the device 100, the control circuit 71 performs the process of step S12 in FIG. 5. At step S12, by using the data generation rule, the control circuit 71 generates an expected value from the check base value. In the present preferred embodiment, the "data generation rule" is, for example, a mathematical function which receives a check base value as input data X and returns a result of computation Y. For instance, eq. 1 below shows an example of the data generation rule.

$$Y=(3\cdot X)/2 \qquad \text{(eq. 1)}$$

If the possible check base value(s) is/are previously known, the data generation rule may be a table in which values of input data X (as check base values) are mapped to corresponding values of data Y.

Into a RAM not shown, the microcontroller 100a stores the expected value that has been computed.

Next, the processing by the microcontroller 100a of the device 100 will be described. The transmission circuit 100b of the device 100 receives the data frame 110 which has been sent from the control circuit 71.

At step S21, the microcontroller 100a of the device 100 parses the received data frame 110 and extracts the check base value that is described in the check base value field 110c. In the present specification, extracting partial data B out of given data A may be expressed as "generating data B from data A".

At step S22, the microcontroller 100a generates a check value from the check base value by using the aforementioned data generation rule (eq. 1).

At step S23, together with the data to be sent, the microcontroller 100a sends data of the determined check value to the control circuit 71. The data having been sent is received by the control circuit 71.

Figure 7:
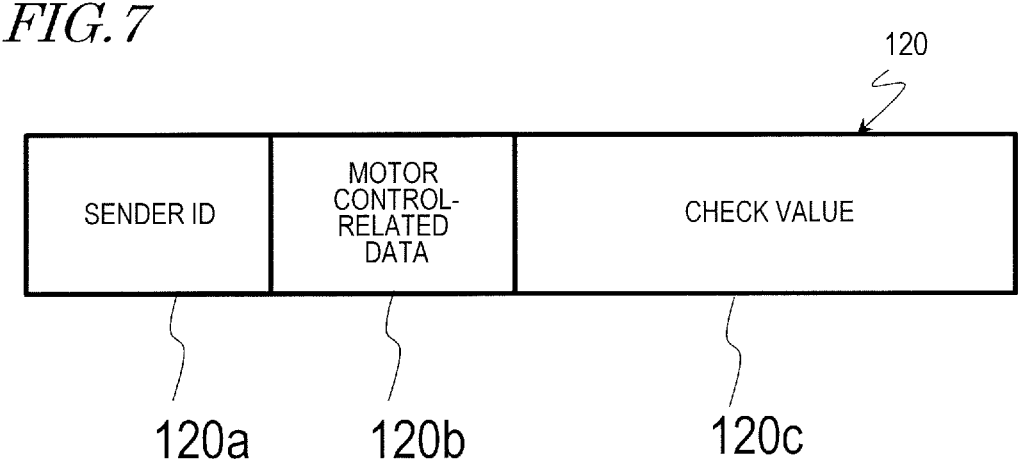
FIG. 7 is a diagram showing a data frame 120 which is sent from the device 100 to the control circuit 71.

FIG. 7 is a diagram showing a data frame 120 which is sent from the device 100 to the control circuit 71. The data frame 120 includes a sender ID field 120a, a data field 120b, and a check value field 120c. The sender ID field 120a describes an identifier that uniquely identifies the device

100. The data field 120*b* stores data to be sent from the device 100 to the control circuit 71, e.g., motor control-related data. The check value field 120*c* stores a check value. In accordance with the aforementioned format, the microcontroller 100*a* of the device 100 constructs the data frame 120.

From the device 100, the control circuit 71 receives the data frame 120, which includes the motor control-related data and the check value.

At step S13, the control circuit 71 extracts the check value from the data received from the device 100.

At step S14, the control circuit 71 compares the extracted check value against the expected value that it has generated on its own, and at step S15, determines whether the expected value and the check value match each other. If they match, the process proceeds to step S16; if they do not match, the process proceeds to step S17.

At step S16, the control circuit 71 permits control of the electric motor that is based on the motor control-related data received from the device 100. In other words, the control circuit 71 generates an electric current command value, and sends it to the motor driving circuit 79 to drive the electric motor 53.

On the other hand, at step S17, the control circuit 71 prohibits any control of the electric motor 53 that is based on the motor control-related data received from the device 100. For example, so long as the control circuit 71 does not generate an electric current command value, the electric motor 53 will not rotate. Note that the control circuit 71 may still allow the electric motor 53 to rotate, on the premise that it is not based on the motor control-related data from the device 100. For example, without utilizing the motor control-related data, the control circuit 71 may perform an operation of "maintaining the present state", an operation of "decreasing the output of the electric motor 53 and maintaining the output", or an operation of "gradually decreasing the output of the electric motor 53 until finally stopping driving". An example of the operation of "maintaining the present state" may be to, if the electrically assisted bicycle 1 is currently traveling, keep it traveling, or, if the electrically assisted bicycle 1 is currently stopped, keep it stopped.

Without executing step S16, the control circuit 71 according to the present preferred embodiment will not permit any driving of the electric motor 53 that is based on the motor control-related data. This means that the processes up to step S15 will never be executed, and thus the electric motor 53 will not be driven in the following cases: if the data frame 120 does not reach the control circuit 71 due to failure of the device 100; if communications cannot occur between the control circuit 71 and the device 100 due to malfunctioning of the bus 82; or if the data frames 110 and/or 120 are broken. Alternatively, the aforementioned alternative operations of, e.g., "maintaining the present state" may be performed instead. Moreover, even if the data frames 110 and 120 are in fact broken but the processes up to step S15 are performed without being able to detect it, the expected value will never match at step S15 anyway. In that case, the control circuit 71 may control the operation in similar manners.

So long as the data generation rule is kept secret, even if the device 100 having authentic functions is replaced with a tampered device by an unauthorized user, the tampered device will not be able to send a correct check value. In another scenario, even if another device fakes the sender ID field 120*a* and pretends to be the device 100 sending motor control-related data, such data will not cause the electric motor 53 to be driven since it will not contain the correct check value.

According to the present preferred embodiment, the control circuit 71 is able to confirm validity of communications by utilizing an expected value that is calculated from the data generation rule and a check value which is received from another device. Driving of the electric motor 53 is permitted only upon confirming validity of communications; if validity cannot be confirmed, any driving of the electric motor 53 that is based on the motor control-related data is prohibited. As a result, reliability of communications is increased without using any special hardware, and driving of the electric motor 53 will be permitted only based on motor control-related data from a valid device.

The control circuit 71 may perform the processing of FIG. 5 at every predetermined period of time. In that case, the control circuit 71 may always send the same check base value to the device 100, or a different check base value each time. In the latter case, the control circuit 71 may generate each new check base value with a method expressed by eq. 2 below, for example.

$$X(n+1)=X(n)+r(n) \tag{eq. 2}$$

Herein, $X(n+1)$ is a check base value to be sent at the $n+1^{th}$ time; $X(n)$ is a check base value to be sent at the $n^{th}$ time; and $r(n)$ is a mathematical function of n, which may be arbitrarily chosen, e.g., a linear function. Alternatively, $r(n)$ may be a constant, e.g., 7.

Figure 8:
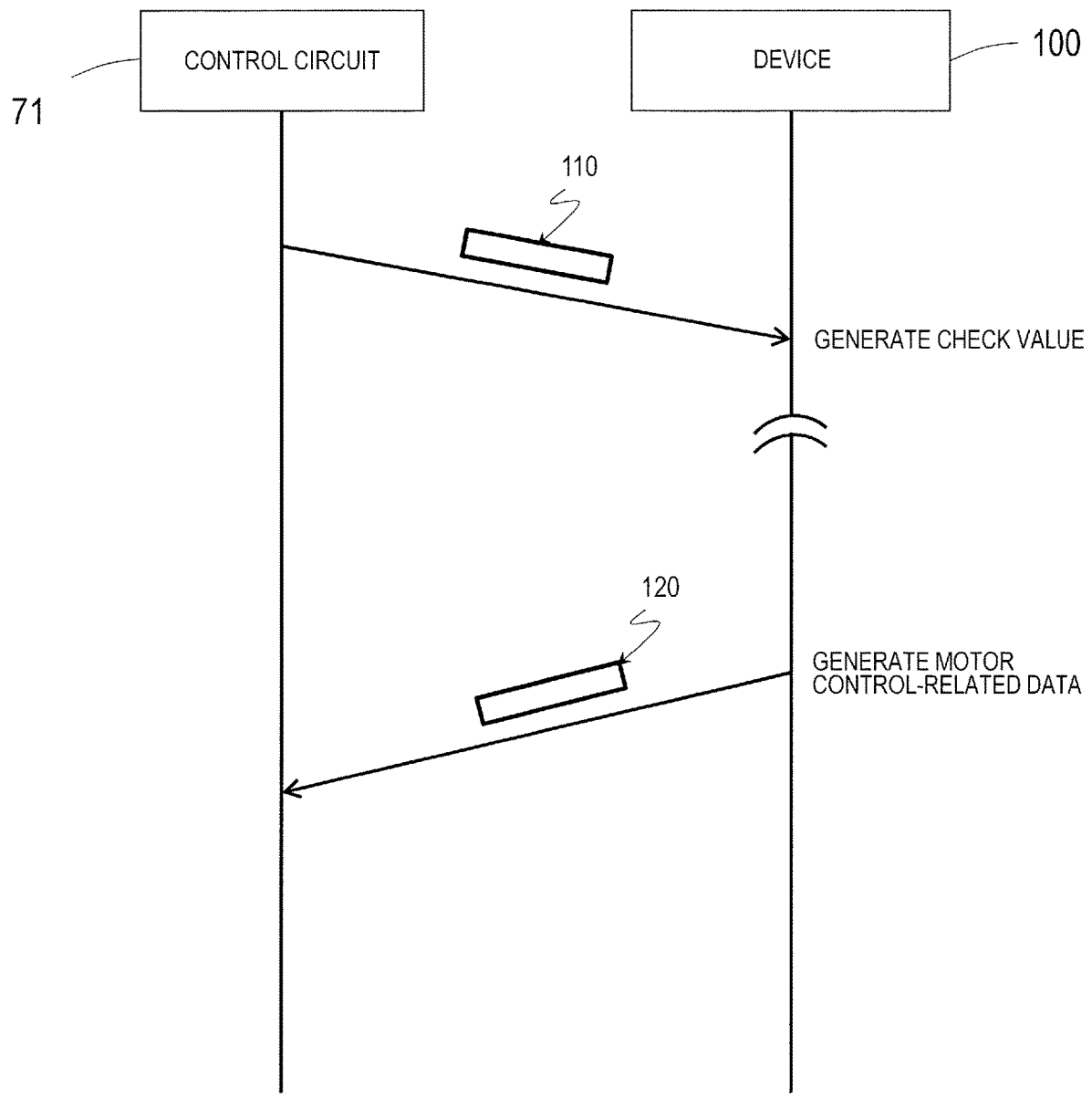
FIG. 8 is a diagram illustrating a situation in which, in the device 100, reception of the data frame 110 from the control circuit 71 and transmission of the data frame 120 to the control circuit 71 are not in synchronization.

In FIG. 5, once a data frame 110 sent from the control circuit 71 is received by the transmission circuit 100*b* of the device 100, the transmission circuit 100*b* of the device 100 sends a data frame 120 containing motor control-related data to the control circuit 71; although this has been illustrated as a sequence of successively occurring events in time, sending of the data frame 120 at step S23 may wait until a need to send the motor control-related data arises. For example, FIG. 8 illustrates a situation in which, in the device 100, reception of the data frame 110 from the control circuit 71 and transmission of the data frame 120 to the control circuit 71 are not in synchronization. The control circuit 71 proceeds and previously sends a check base value to the device 100. The microcontroller 100*a* of the device 100 may readily generate a check value and keep it retained as shown in FIG. 8; alternatively, the control circuit 71 may generate the check value, and construct the data frame 120 therefrom together with the motor control-related data at the time of sending out the motor control-related data.

Figure 9:
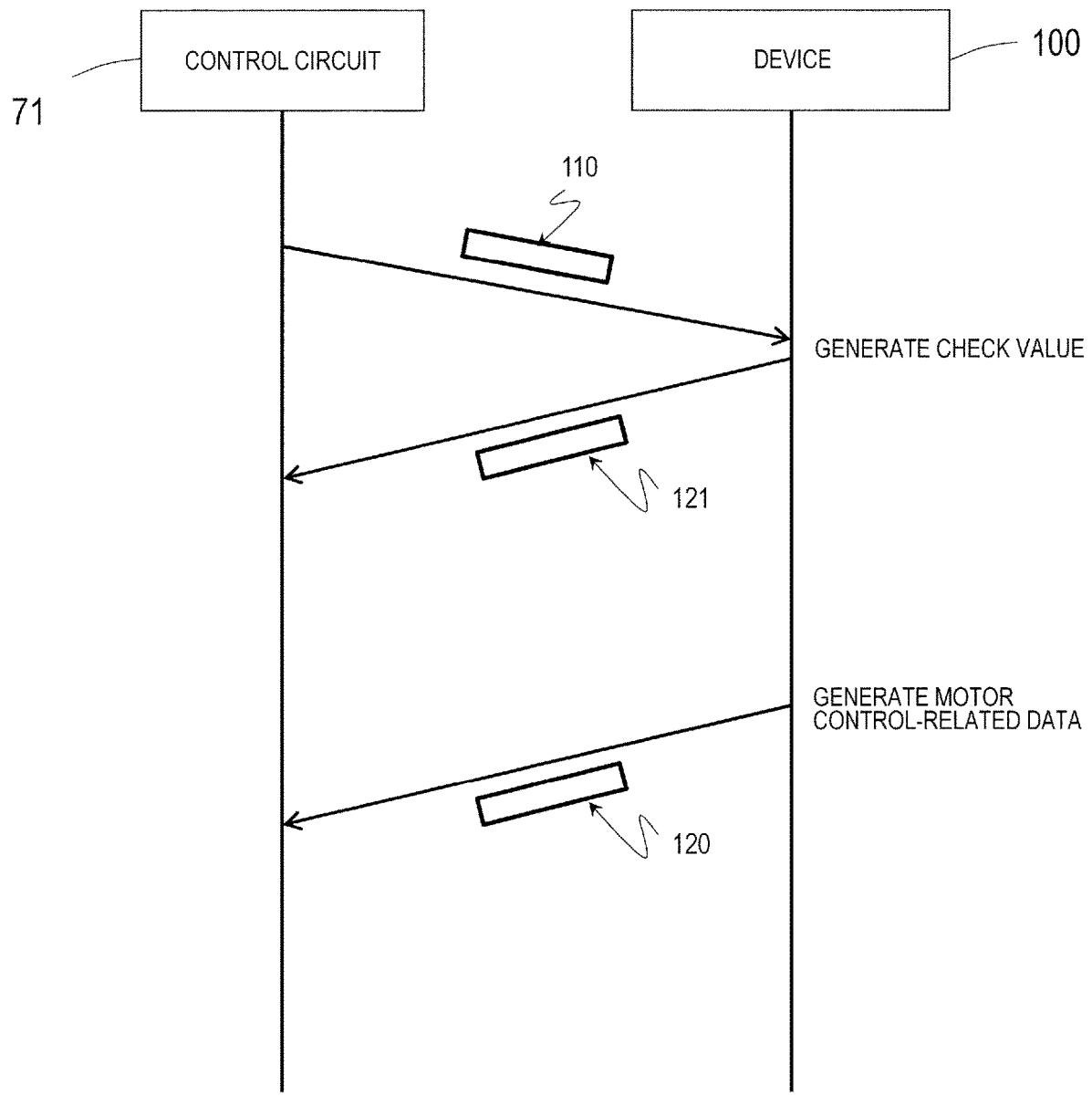
FIG. 9 is a diagram illustrating a situation in which the device 100 sends a data frame 121 in response to reception of the data frame 110 from the control circuit 71.

However, it is preferable to be able to confirm validity of communications at the time needed by the control circuit 71. For example, FIG. 9 illustrates a situation in which the transmission circuit 100*b* of the device 100 sends a data frame 121 in response to reception of the data frame 110 from the control circuit 71. Once the data frame 110 is received from the control circuit 71, the microcontroller 100*a* of the device 100 may execute steps S21 and S22 in FIG. 5, and at step S23, send the data frame 121, which contains the check value but no motor control-related data, to the control circuit 71, via the transmission circuit 100*b*. When a need arises to send motor control-related data, the microcontroller 100*a* of the device 100 may further construct a data frame 120 containing the same check value at that point in time, and send the data frame 120 to the control circuit 71.

Second Preferred Embodiment

The present preferred embodiment will describe a process that increases the validity of communications in the case in which the control circuit 71 and the device 100 frequently exchange data frames while changing the check base value. The description of the construction and fundamental operation from FIG. 1 to FIG. 7, as has been set forth with respect to the First Preferred Embodiment, will also be relied on in the present preferred embodiment; any redundant description thereof will be omitted.

Figure 10:
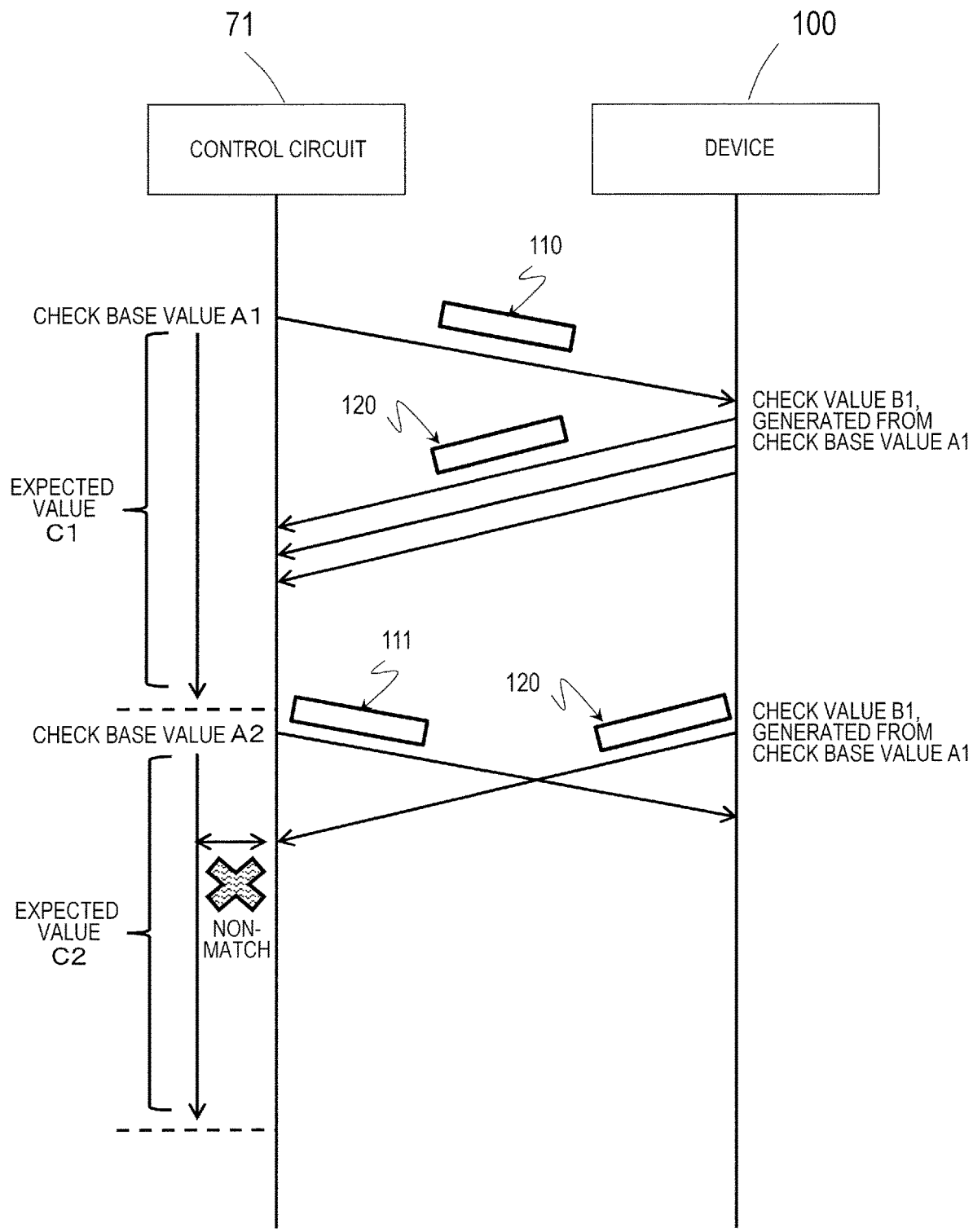
FIG. 10 is a diagram illustrating problems when the control circuit 71 and the device 100 frequently exchange data frames while changing the check base value.

FIG. 10 illustrates problems when the control circuit 71 and the device 100 frequently exchange data frames while changing the check base value.

Consider a case in which the control circuit 71 alters the check base value on a regular basis by using eq. 2, for example.

First, the control circuit 71 sends a data frame 110 that contains a check base value A1 to the device 100. The microcontroller 100a of the device 100 allows a check value B1 which it has generated from the check base value A1 to be contained in the data frame 120, and sends the data frame 120 to the control circuit 71. Until receiving a next check base value from the control circuit 71, the microcontroller 100a will generate the check value B1 by using the latest check base value A1. The control circuit 71 compares the check value B1 against an expected value C1 which it has generated from the check base value A1.

Suppose that, immediately after sending a data frame 111 that contains a next check base value A2 to the device 100, the control circuit 71 receives the data frame 120 from the device 100. Because the device 100 has not received the data frame 111 yet, the data frame 120 stores the check value B1, which was generated from the check base value A1. The control circuit 71 will compare the check value B1 against an expected value C2 which it has generated from the check base value A2. Consequently, the two will not match, and control of the electric motor 53 that is based on the motor control-related data that is contained in the data frame 120 will be prohibited (step S17 in FIG. 5).

Therefore, in the present preferred embodiment, the check base value A1 and/or expected value C1 will be regarded as valid even after the check base value A2 begins to be used.

Figure 11:
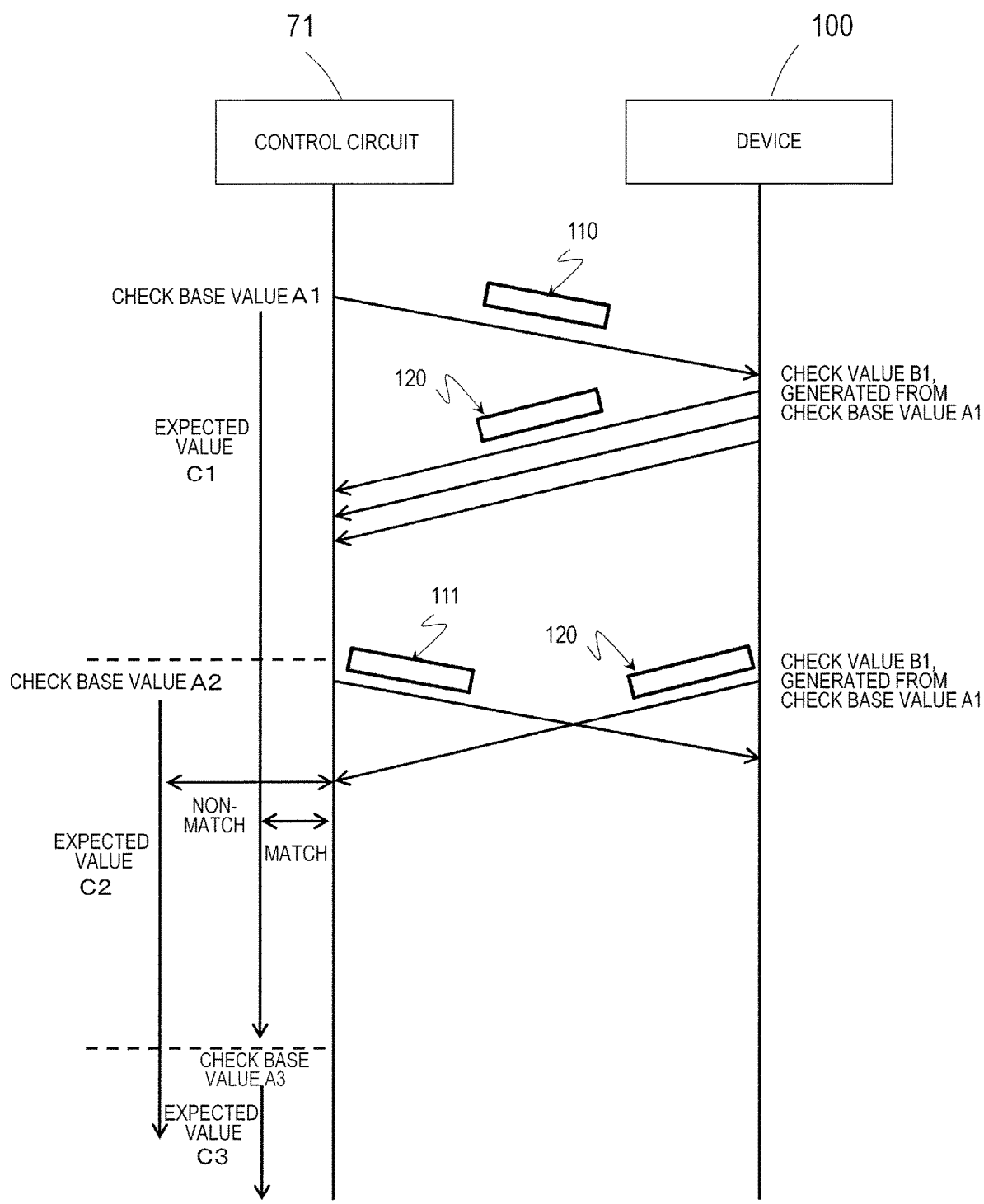
FIG. 11 is a diagram showing a process in which the control circuit 71 concurrently utilizes a check base value A1 and an expected value C1 as well as a check base value A2 and an expected value C2.

FIG. 11 illustrates a process in which the control circuit 71 according to the present preferred embodiment concurrently utilizes the check base value A1 and the expected value C1 as well as the check base value A2 and the expected value C2. The control circuit 71 retains the expected value C1 even after the check base value A2 begins to be used. If a comparison between the expected value C2 and the check value B1 indicates a non-match, the expected value C1 and the check value B1 are further compared. Since the expected value C1 and the check value B1 match, even in a situation which would result in a non-match in the process of FIG. 10, control of the electric motor 53 that is based on the motor control-related data will be appropriately carried out.

In the aforementioned processing, the control circuit 71 may store the check base value A2 of the latest generation that has been sent to the device 100 and the check base value A1 from one generation before in a storage (e.g., a RAM). Alternatively, the control circuit 71 may store the expected value C2 of the latest generation that has been sent to the device 100 and the expected value C1 from one generation before in a storage (e.g., a RAM).

Figure 12:
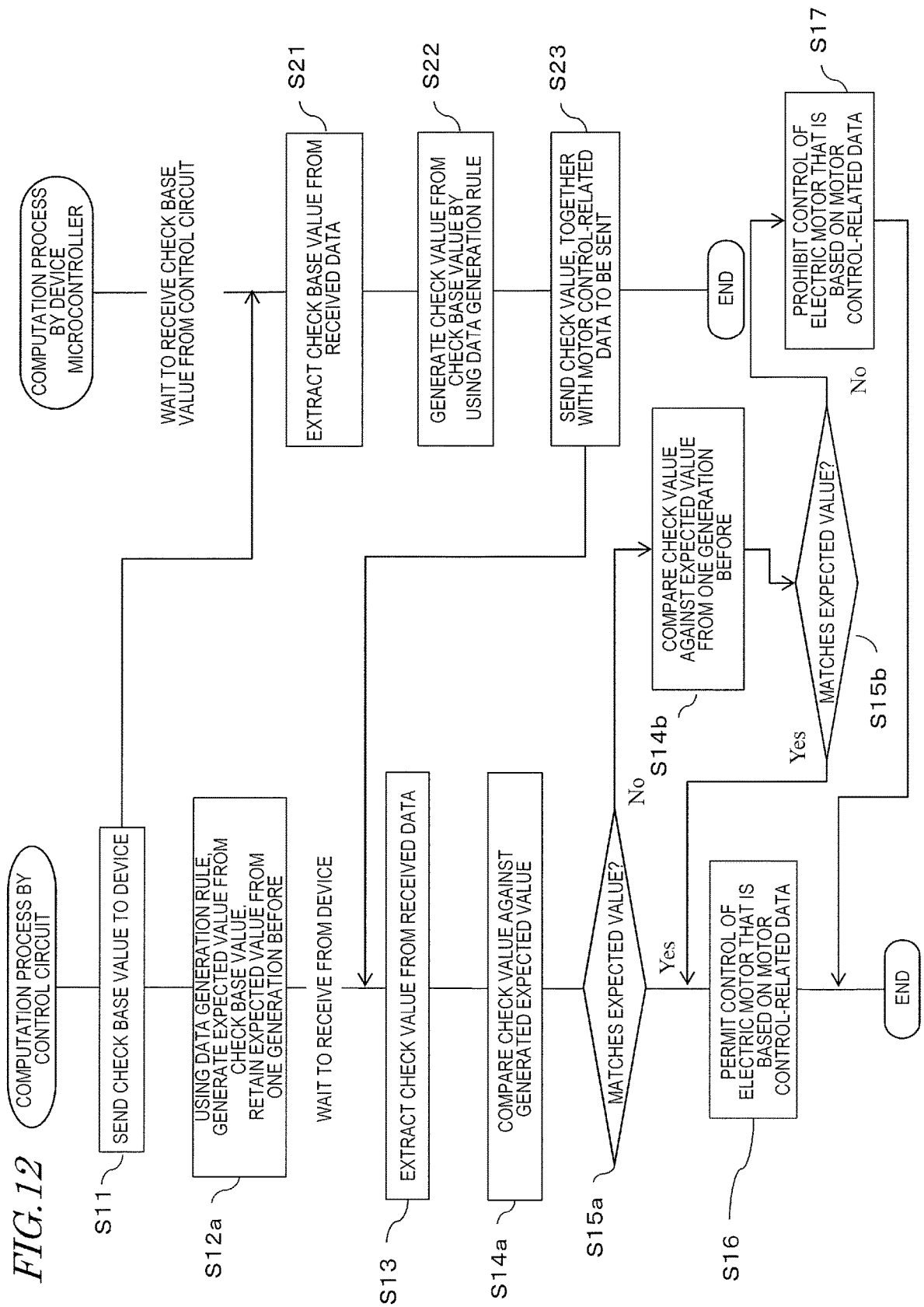
FIG. 12 is a flowchart showing processes respectively performed by the control circuit 71 and the microcontroller 100a of the device 100.

FIG. 12 is a flowchart showing processes according to the present preferred embodiment, which are respectively performed by the control circuit 71 and the microcontroller 100a of the device 100. Differences from FIG. 5 are that steps S12, S14, and S15 in FIG. 5 are replaced by steps S12a, S14a, and S15a, with additional steps S14b and S15b being included. Hereinafter, only the differences will be described.

At step S12a, upon newly generating an expected value, the control circuit 71 causes the expected value from the previous generation, as an old expected value, to be retained in a storage (e.g., a RAM). The newly generated expected value is an expected value "of the latest generation", whereas the expected value that is now retained in the RAM is an expected value "from one generation before".

At step S14a, the control circuit 71 compares the check value that is contained in the data frame 120 against the expected value of the latest generation. Step S15a determines whether the result of comparison indicates a match or not. If the result of comparison indicates a non-match, the process proceeds to step S14b. At step S14b, the control circuit 71 reads from the RAM the expected value from one generation before that was retained there, compares the check value against this expected value, and at step S15b, determines whether the expected value and the check value match each other. If they match, the process proceeds to step S16; if they do not match, the process proceeds to step S17.

Third Preferred Embodiment

The present preferred embodiment will describe a process that provides an even higher validity of communications between the control circuit 71 and the device 100. The description of the construction and fundamental operation from FIG. 1 to FIG. 7, as has been set forth with respect to the First Preferred Embodiment, will also be relied on in the present preferred embodiment; any redundant description thereof will be omitted.

In the present preferred embodiment, the data that is utilized by the microcontroller 100a of the device 100 to generate a check value is extended in scope, and the data that is utilized by the control circuit 71 to generate an expected value is also extended in scope. For example, the control circuit 71 and the microcontroller 100a may generate an expected value and a check value by utilizing the data field 110b and/or the data field 120b shown in FIG. 6 and FIG. 7.

The example of FIG. 6 will be discussed. Upon receiving data frame 110, the microcontroller 100a of the device 100 extracts a whole or a portion of the data that is described in the data field 110b (e.g., a request to generate a check value) and a check base value that is described in the check base value field 110c, and computes a logical AND therebetween. In other words, a computation according to eq. 3 below is performed.

$$Y = (\text{data extracted from data field } 110b) \text{ AND } (\text{check base value extracted from check base value field } 110c) \qquad (\text{eq. 3})$$

The control circuit 71 also performs a similar computation by using eq. 3 to generate an expected value. Even if a check base value becomes known to the public, a different check value and a different expected value will result as the data extracted from the data field 110b changes. This provides a higher validity of communications.

Next, the example of FIG. 7 will be discussed. In the above instances, the microcontroller 100a of the device 100 generates a check value from the data in the data frame 110 alone. However, in addition to the data in the data frame 110, the microcontroller 100a may also utilize the motor control-related data that is contained in the data field 120b of the data frame 120 in generating a check value.

Upon receiving the data frame 110, the microcontroller 100a calculates a logical AND between the check base value that is described in the check base value field 110c and the motor control-related data to be described in the data field 120b of the data frame 120 to be sent to the control circuit 71. In other words, a computation according to eq. 4 below is performed.

$$Y = \text{(check base value described in check base value field } 110c) \text{ AND (motor control-related data to be described in data field } 120b) \quad \text{(eq. 4)}$$

The control circuit 71 cannot know in advance what motor control-related data will be described in the data field 120b. Therefore, unlike in the examples of the First and Second Preferred Embodiments, the control circuit 71 is unable to generate an expected value in advance according to the present preferred embodiment.

Upon receiving the data frame 120, the control circuit 71 extracts the motor control-related data that is described in the data field 120b of the data frame 120 and the check value that is described in the check value field 120c. The control circuit 71 calculates a logical AND between the check base value that has been sent to the device 100 and the motor control-related data that has been extracted from the data field 120b, and generates an expected value. Then, the control circuit 71 compares the check value that is described in the check value field 120c against this expected value. Thus, according to the present preferred embodiment, the check value and the expected value are generated only after receiving data that is uniquely retained by the device (e.g., 120) which is at the other end of the communication. This provides a further enhanced validity of communications, as compared to the examples of the First and Second Preferred Embodiments.

Hereinafter, variants that are applicable to the Second and Third Preferred Embodiments 3 will be described.

Suppose that the control circuit 71 permits control of the electric motor that is based on the motor control-related data from the device 100, and that rotation of the electric motor 53 has already begun. Even while controlling rotation of the electric motor 53, the control circuit 71 keeps sending the data frame 110 to the device 100 and receiving the data frame 120 from the device 100. In accordance with the motor control-related data that is described in the data frame 120, the control circuit 71 may alter the rotational speed, etc. The control circuit 71 may send the data frame 110 to the device 100 as often as once every 100 milliseconds, for example. On the other hand, the microcontroller 100a of the device 100 may send the data frame 120 as often as once every 50 milliseconds, for example.

So long as the data frame 120 is being received at intervals of every 50 milliseconds from the device 100 and the check value matches the expected value, the control circuit 71 permits control of the electric motor 53 that is based on the motor control-related data, and keeps the electric motor 53 rotating.

However, if the data frame 120 has not been received from the device 100 for a certain interval or longer, it is presumed that the device 100 is in an abnormal state. When the data frame 120 has not been received for, e.g., 500 milliseconds or longer, the control circuit 71 may prohibit any control of the electric motor 53 that is based on the motor control-related data. As a result, the electric motor 53 of the electrically assisted bicycle 1 may be stopped, thus preventing the electrical assistance system including the abnormal device from being used.

Alternatively, if a non-match between the check value in the data frame 120 and the expected value has occurred for a predetermined number of times or greater in succession, then the control circuit 71 may forcibly stop driving of the electric motor 53.

Preferred embodiments of the present invention are suitably applicable to communications between a control circuit that controls an electric motor and a device that sends, via transmission circuit, to the control circuit some motor control-related data which is used to control rotation of the electric motor.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electrically assisted vehicle comprising:
    an electric motor;
    a device including a microcontroller and a transmission circuit, the transmission circuit sending motor control-related data used to control rotation of the electric motor; and
    a control circuit that controls the electric motor based on the motor control-related data; wherein
    the control circuit and the device communicate with each other and both retain a same data generation rule;
    when the control circuit sends first data to the device, the transmission circuit receives first reception data from the control circuit, the microcontroller generates second data at least including a portion of the first reception data, the microcontroller generates third data from the second data by using the data generation rule, and the transmission circuit sends the third data to the control circuit; and
    the control circuit receives second reception data from the device, generates fourth data at least from the first data by using the data generation rule, compares a portion of the second reception data and the fourth data, and if a result of the comparison indicates a match, permits control of the electric motor that is based on the motor control-related data.

2. The electrically assisted vehicle of claim 1, wherein, if the result of the comparison indicates a non-match, the control circuit prohibits any control of the electric motor that is based on the motor control-related data from the device.

3. The electrically assisted vehicle of claim 1, wherein
    the first reception data received by the transmission circuit includes the first data;
    the microcontroller generates the third data from the second data by using the data generation rule, and the second data includes the first data;
    the second reception data received by the control circuit includes the third data; and
    the control circuit generates the fourth data at least from the first data by using the data generation rule, and compares the third data against the fourth data.

4. The electrically assisted vehicle of claim 3, wherein the third data includes the motor control-related data.

5. The electrically assisted vehicle of claim 3, wherein the control circuit alters a content of the first data each time the control circuit sends the first data to the device.

6. The electrically assisted vehicle of claim 1, wherein, in response to the first reception data received from the control circuit, the transmission circuit sends the third data to the control circuit.

7. The electrically assisted vehicle of claim 6, wherein the third data includes data other than the motor control-related data.

8. The electrically assisted vehicle of claim 5, wherein
the control circuit includes a storage that stores first data of a latest generation that has been sent to the device and that stores first data from one generation before the latest generation; and
the control circuit reads from the storage the first data of the latest generation and the first data from the one generation before the latest generation, generates pieces of the fourth data respectively from the first data of the latest generation and the first data from the one generation before by using the data generation rule, and if a portion of the second reception data matches either piece of the fourth data, permits control of the electric motor that is based on the motor control-related data.

9. The electrically assisted vehicle of claim 5, wherein
the control circuit includes a storage that stores fourth data of a latest generation and that stores fourth data from one generation before the latest generation; and
the control circuit reads from the storage the fourth data of the latest generation and the fourth data from the one generation before the latest generation, and if a portion of the second reception data matches either fourth data, permits control of the electric motor that is based on the motor control-related data.

10. The electrically assisted vehicle of claim 1, wherein
the first reception data received by the device includes the first data;
the second data includes the first data and the motor control-related data;
the microcontroller generates the third data from the first data included in the second data by using the data generation rule, and the transmission circuit sends the third data and the motor control-related data to the control circuit;
the second reception data received by the control circuit includes the third data and the motor control-related data; and
the control circuit generates the fourth data from the first data and the motor control-related data by using the data generation rule, and compares the third data included in the second reception data against the fourth data.

11. The electrically assisted vehicle of claim 10, wherein
while the control circuit is controlling the electric motor based on the motor control-related data from the device, the control circuit intermittently sends the first data to the device, and, if the result of the comparison fails to indicate a match for a predetermined period of time or longer, prohibits any control of the electric motor that is based on the motor control-related data.

12. The electrically assisted vehicle of claim 1, wherein the motor control-related data is data representing a walk assist mode, the walk assist mode being an operating mode in which the electric motor is operated irrespective of whether the rider is riding on the electrically assisted vehicle or not.

13. The electrically assisted vehicle of claim 4, wherein the control circuit alters a content of the first data each time the control circuit sends the first data to the device.

14. The electrically assisted vehicle of claim 13, wherein
the control circuit includes a storage that stores first data of a latest generation that has been sent to the device and that stores first data from one generation before the latest generation; and
the control circuit reads from the storage the first data of the latest generation and the first data from the one generation before the latest generation, generates pieces of the fourth data respectively from the first data of the latest generation and the first data from the one generation before by using the data generation rule, and if a portion of the second reception data matches either piece of the fourth data, permits control of the electric motor that is based on the motor control-related data.

15. The electrically assisted vehicle of claim 13, wherein
the control circuit includes a storage that stores fourth data of a latest generation and that stores fourth data from one generation before the latest generation; and
the control circuit reads from the storage the fourth data of the latest generation and the fourth data from the one generation before the latest generation, and if a portion of the second reception data matches either fourth data, permits control of the electric motor that is based on the motor control-related data.

* * * * *